Nov. 1, 1960  I. BONIC  2,958,143
DEVICE FOR CLEARING SNOW FROM THE PATH OF AN AUTOMOBILE WHEEL
Filed Jan. 4, 1955
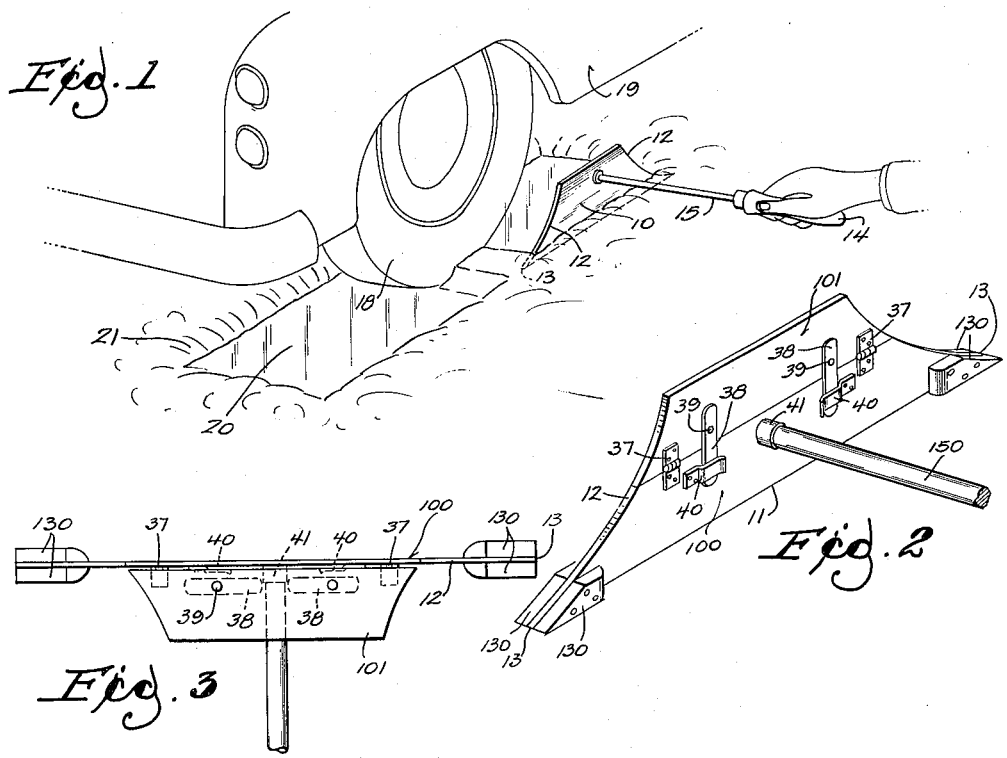
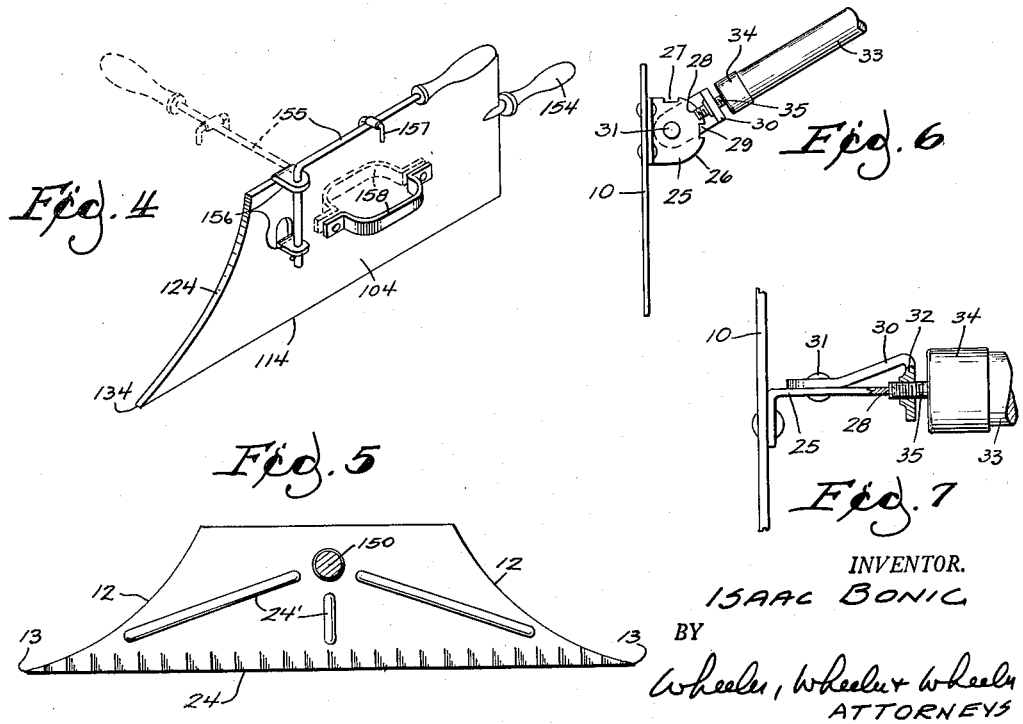
INVENTOR.
ISAAC BONIC
BY
Wheeler, Wheeler & Wheeler
ATTORNEYS

United States Patent Office 2,958,143
Patented Nov. 1, 1960

2,958,143

DEVICE FOR CLEARING SNOW FROM THE PATH OF AN AUTOMOBILE WHEEL

Isaac Bonic, 2207 N. 16th St., Milwaukee, Wis.

Filed Jan. 4, 1955, Ser. No. 479,791

2 Claims. (Cl. 37—53)

This invention relates to a device for clearing snow from the path of an automobile wheel.

Even an inch or two of snow or slush may obstruct a vehicle wheel sufficiently to preclude starting the vehicle, whereas, if the vehicle wheel has a free path which is even a couple of feet in length, it will be able to surmount much deeper snow with ease and to maintain vehicle motion. Accordingly, the present invention contemplates provision of a scraper which has concave upper margins and a substantially straight lower margin to which the upper margins extend at relatively sharp apices which will permit the scraper to operate under the curve of the pneumatic casing sufficiently far to displace any accumulations of snow, slush or even ice which would impede wheel rotation. For facilitating action on frozen or semi-frozen material, the blade may have a chisel point or a convoluted form, or both. In order to facilitate the use of a blade in close quarters, as, for example, when the wheel is close to a curb, the blade is desirably adjustable with respect to its handle and may have a hinged top portion to reduce its height.

In the drawings:

Fig. 1 is a view in perspective showing the manner of use of a scraper embodying the invention.

Fig. 2 is a view in perspective on an enlarged scale showing a modified embodiment.

Fig. 3 is a plan view of the device of Fig. 2.

Fig. 4 is a view in perspective of a further modified embodiment of the invention.

Fig. 5 is a view in rear elevation of a further modified embodiment of the invention, its handle being shown in section.

Fig. 6 is a view in end elevation of a further modified embodiment using an adjustable handle connection.

Fig. 7 is a plan view of the device of Fig. 6 on an enlarged scale, portions being broken away.

The scraper embodying my invention may have any desired form of handle and there may also be wide variation in the material and shape of the blade provided only that the blade 10 should have a substantially straight lower edge 11 to which at least one concave top margin 12 is convergent to a sharp apex at 13. Desirably, the concave upper edge 12 and the sharp apex 13 appear at both ends of the blade.

In the construction shown in Fig. 1, the handle 14 is the end of a relatively short rod 15 which has a threaded end portion extending through the blade. This is to be understood as merely representative of one of many possibilities in this regard. It is desirable that the handle be readily applicable and detachable in order that the parts may conveniently be stored in the vehicle trunk, but the particular means of attachment is not important except as hereinafter noted.

The wheel 18 of a vehicle 19 is illustrated. The surface of the pavement is shown at 20 and a deposit of snow or slush is represented at 21. The view shows how the pointed end 13 of the scraper passes beneath the periphery of the tire casing sufficiently to remove substantially completely all snow or slush which could impede the starting movement of the vehicle wheel. By using the scraper both ahead and behind the position of the wheel, a sufficient length of pavement 20 is cleared to provide a track in which the vehicle wheel and the vehicle as a whole may readily acquire sufficient momentum to overcome the resistance of such snow or slush as remains ahead of the wheel in the course of its movement.

In the construction of Fig. 4, the blade 104 has but a single apex 134 formed by the convergence of its concave margin 124 to its scraping edge 114. The blade is squarecut at the other end and carries a handle 154 so that it can be manipulated with one hand if desired.

For two-handed manipulation, either from the right or from the left, a pulling handle 155 is pivoted at 156 to the top of the blade so that it may be swung either to the right or to the left according to the direction of use. It is normally maintained in the plane of the blade by a pivoted clip at 157 which has the form of a staple and drops over the top edge of the blade as shown in Fig. 4, but may be oscillated upwardly to free the pulling handle 155 for swinging movement.

The fixed handles 158 are desirably connected to opposing faces of the blade so that they may be grabbed alternatively by one hand of the operator while his other hand is used in pulling the blade by means of pulling handle 155 or manipulating it by handle 154. Particularly when the snow is relatively light, the operator can manipulate the blade through the use of handle 154 alone. Obviously, this handle may be grasped either with the right or left hand of the operator, to suit his convenience. If the snow is heavier, he may wish to grasp the handle 158, also, at either side of the blade. Assuming that he has to reach under the vehicle to any extent, the operator may prefer to use the pulling handle 155 by swinging it to project laterally either at the left or the right so that he can pull the blade as shown in Fig. 1. To steady the blade and keep it from pivoting during the pulling movement, the operator can grasp either handle 154 or one of the handles 158.

In the construction of Fig. 5, the lower margin of the blade has zigzag convolutions at 24. The rest of the blade is substantially planiform except for reenforcing ribs at 24'. The ribs and convolutions not only stiffen the blade but, if the blade is tilted slightly from the vertical, the convolutions provide sharp cutting edges comparable to teeth and useful in scraping away ice.

Because the vehicle wheel may be very close to the curb, it may be desirable to provide for an adjustment between the handle and the blade if the handle projects laterally. One means of accomplishing this result is shown in Figs. 6 and 7. Here the blade 10 has a rearwardly projecting bracket 25, the arcuate margin 26 of which is provided with notches at 27, 28 and 29. The handle carrier 30 is pivoted by means of a rivet 31 to the bracket 25 and has a screwthreaded portion 32 outside of the curvilinear margin 26 of the bracket. The handle 33 is provided at its end with a ferrule 34 from which projects a threaded stud 35 screwed into the portion 32 of the handle carrier 30. With the handle partially unscrewed from carrier 30, the stud is retracted sufficiently to clear the margin 26 of bracket 25. When the handle is adjusted angularly to register the stud 35 with any one of the notches 27, 28 or 29, and is then screwed forwardly in the carrier, the free end of the stud will engage in the selected notch to retain that angular position of the handle with respect to the blade. With the stud engaged in the notches 29, the handle will be at right angles to the blade. If the handle is in the notch 28, the handle will extend obliquely upwardly as shown in Fig. 6. If the handle stud is engaged in notch 27, the blade will be in line with the handle, an adjustment which is particularly desirable when the tool is to be hung on the wall or otherwise stored. For carrying the tool in a vehicle trunk, the handle may be completely unscrewed from the carrier so that the handle and the blade can be stored separately.

If desired, the chisel edges provided on any of the various embodiments of my invention may be widened by applying one or more complementary blocks 130 thereto as shown in Figs. 2 and 3. The width of the apices may thereby be increased to the approximate thickness of three-fourths of an inch. At the same time, the weight of the tool will be increased so that it will be very effective as an ice axe or the like for chipping away ice which may have formed on the pavement beneath the wheel of the vehicle in such a way as to resist all ordinary scraping action. In order to permit the tool to be used effectively for this purpose, it may be desirable to reduce the height of the blade 100 so that the tool may be swung beneath the fender or body of the vehicle. Figs. 2 and 3 show an arrangement in which the top portion 101 of the blade 100 is connected by hinges 37 to the blade 100 for movement between the upright position of alignment shown in Fig. 2 and the substantially horizontal position of Fig. 3, in which the blade extension 101 rests upon the handle 150. Bars 38 pivoted at 39 may be swung to and from an engagement in the respective keepers 40 to hold the blade extension 101 erect as in Fig. 2, or to permit its pivotal motion to the position of Fig. 3.

Handle 150 is screwed detachably into a socket 41 fixed centrally to the blade 100, this feature being usable with any of the disclosed types of tools.

It will be evident that the device of Figs. 2 and 3 will perform the same scraping function as the devices of Figs. 1 and 4 to 7 and will also be of considerable aid in chipping away ice from beneath the tire casing under circumstances such that the ice could not be removed successfully with a tool used solely as a scraper. In addition to the increased width of the chisel edge 13 which is provided by the blocks 130, these blocks, and also the collapsible blade extension 101 increase the mass of the tool, this being desirable when the tool is used to chip ice.

I claim:
1. A scraper for removing snow and the like from the path of the wheel of a parked vehicle, said tool comprising a blade having a pavement-contacting lower margin and having at least one of its end margins concave at a radius approximating the periphery of the wheel and converging at a sharp apex to said lower margin, whereby said blade is operable to remove substantially all material from the path of the wheel, the blade being provided with a handle for its manipulation, said blade having a collapsible upward extension.

2. The device of claim 1 in which the extension is hinged to the blade for movement between an upright and a collapsed position, the blade and extension having complementary bar and keeper means for holding the extension normally in its upright position.

References Cited in the file of this patent

UNITED STATES PATENTS

| D. 20,188 | McDonough | Oct. 7, 1890 |
| 167,229 | Dunham | Aug. 31, 1875 |
| 285,604 | Finn et al. | Sept. 25, 1883 |
| 403,655 | Gates | May 21, 1889 |
| 2,799,952 | Weingand | July 23, 1957 |
| 2,826,835 | O'Shea | Mar. 18, 1958 |